UNITED STATES PATENT OFFICE.

EDWARD HENRY HAMILTON, OF ANACONDA, MONTANA.

PROCESS OF TREATING COPPER ORES.

No. 837,562.  Specification of Letters Patent.  Patented Dec. 4, 1906.

Application filed December 19, 1905. Serial No. 292,511.

*To all whom it may concern:*

Be it known that I, EDWARD HENRY HAMILTON, a citizen of the United States, and a resident of Anaconda, in the county of Deerlodge and State of Montana, have invented a new and Improved Process of Treating Copper Ores, of which the following is a full, clear, and exact description.

As is well known, the ordinary process of converting copper mattes is to perform the converting operation in the presence of silica. This is done in a metal vessel, which is lined with silica or material containing it, or if a basic lining is used instead of an acid lining silica is thrown in in bulk through the top of the converter in order that the proper reaction between the oxids of iron formed during the converting operation and the silicious material may take place to remove the iron and produce slag. The acid process is one of great importance in this country; but the renewal of the lining is an operation which is costly, and one of the principal objects of my invention is to introduce a step into this process which will result in the more gradual eating away of the lining and also in a more uniform action on the lining, which will prevent the necessity of relining the converter until practically the entire available lining is acted upon.

Further objects of the invention will appear in the course of the following description.

I have discovered that the addition of suitable compounds of the alkaline earths to the molten matte at the time of charging or immediately thereafter and during the bessemerizing or blowing of the charge (said charge consisting of matte with suitable admixtures of silicious flux, or even without the silica where the lining is an acid one) hastens the fluxing and elimination of the foreign metallic impurities—such as iron oxids, sulfur, and the like—effecting a rapid separation of the copper sulfid from the resulting slag and shortening the time of blowing fully one-fifth. If silica or silicious ores are added with the alkaline-earth compound, the rapid formation of the resulting double or compound and more fusible silicate of iron and calcium (where lime is used) not only reduces the time of bessemerization or blowing, as stated, but in a measure preserves the lining of the converter where an acid one is employed, the deterioration to which the lining is subjected under those circumstances being very gradual and very even; but whether a silicious flux be added or not (where an acid lining is used) or where it is added in proper quantities in case a basic lining is employed the addition of the alkaline-earth compounds during the bessemerizing or blowing of the charge is important, since their presence exercises in a measure a mechanical effect, bringing every available particle of iron oxid into intimate and quick contact with the flux, the compounds concurrently entering as components into the resulting slag and reducing the time of blowing. This mechanical effect is no doubt due to the evolution of gases from the alkaline-earth compound, (such as carbonic acid where lime is used,) which have the effect of supplementing the agitating and stirring action of the blast.

Another important advantage appears to be the hastening of the oxidizing action and the increase in heat due to rapid chemical decomposition of the matte, so that large quantities of ore cleanings and ores may be added to the charge without chilling the same. This is an immense advantage in the converting operation on account of the expense which is otherwise involved in sending these materials to the blast-furnace. The compounds which I prefer to use for this purpose are of somewhat varying character. I employ calcium either in the form of quicklime, limestone, or sulfate of lime, and the similar compounds of barium I can employ substantially in the same manner. If it were less expensive, the compounds of strontium might also be used.

Having thus described my invention, I claim as new and desire to secure by Letters Patent—

1. In the converting of copper mattes the process of blowing the charge of molten matte in contact with an acid converter-lining in the presence of suitable alkaline-earth compounds introduced into said charge, and concurrently with the formation of the slag from which the resulting copper sulfid becomes rapidly separated.

2. In the converting of copper mattes, the process of blowing or bessemerizing the molten matte associated with proper acid fluxing material, in the presence of a suitable alkaline-earth compound introduced into said charge, thereby concurrently forming a double or compound silicate or slag, and permitting the separation of the resulting copper sulfid.

3. In the converting of copper mattes, the process of blowing or bessemerizing the charge of molten matte, and silicious flux in the presence of calcium carbonate, thereby permitting the concurrent formation of a readily-fusible double silicate of iron and calcium, and the rapid separation of the resulting copper sulfid therefrom.

4. In the converting of copper mattes, the process of blowing or bessemerizing the charge of molten matte in the simultaneous presence of a silicious reagent, and an alkaline-earth compound added to the charge, whereby a correspondingly concurrent double or compound silicate or slag results from the blow, and a rapid separation of the copper sulfid follows.

In testimony whereof I have signed my name to this specification in the presence of two subscribing witnesses.

EDWARD HENRY HAMILTON.

Witnesses:
E. P. MATHEWSON,
H. R. BURG.